(12) United States Patent
Balasubramanian et al.

(10) Patent No.: US 12,294,906 B2
(45) Date of Patent: May 6, 2025

(54) GEOFENCING PROVISIONING SERVER

(71) Applicants: Celona, Inc., Cupertino, CA (US);
Giesecke+Devrient Mobile Security America, Inc., Dulles, VA (US)

(72) Inventors: Srinivasan Balasubramanian, San Diego, CA (US); Hemant Udhavrao Borase, Livermore, CA (US); José Manuel Nieto Gómez, Redmond, WA (US)

(73) Assignees: Celona, Inc., Campbell, CA (US);
Giesecke+Devrient Mobile Security America, Inc., Dulles, VA (US)

( * ) Notice: Subject to any disclaimer, the term of this patent is extended or adjusted under 35 U.S.C. 154(b) by 312 days.

(21) Appl. No.: 17/859,924

(22) Filed: Jul. 7, 2022

(65) Prior Publication Data

US 2023/0011183 A1    Jan. 12, 2023

Related U.S. Application Data

(60) Provisional application No. 63/203,112, filed on Jul. 8, 2021.

(51) Int. Cl.
*H04W 4/021*    (2018.01)

(52) U.S. Cl.
CPC .................. *H04W 4/021* (2013.01)

(58) Field of Classification Search
CPC ..................................... H04W 4/021

USPC ....................................... 455/456.1
See application file for complete search history.

(56) References Cited

U.S. PATENT DOCUMENTS

| 2007/0143013 | A1 | 6/2007 | Breen |
| 2015/0181382 | A1 | 6/2015 | McDonald et al. |
| 2019/0069337 | A1 | 2/2019 | Zhao et al. |
| 2019/0391800 | A1* | 12/2019 | Lin ........................ G06F 8/65 |
| 2020/0008007 | A1* | 1/2020 | Belghoul ............ H04W 48/18 |
| 2021/0195686 | A1 | 6/2021 | Kaur |

OTHER PUBLICATIONS

Rodriguez, Kari, International Search Report and Written Opinion received from the USRO dated Oct. 6, 2022 for appln. No. PCT/US2022/036465, 9 pgs.

* cited by examiner

*Primary Examiner* — Michael R Neff
(74) *Attorney, Agent, or Firm* — Jaquez Land Greenhaus & McFarland, LLP; Bruce W. Greenhaus

(57) ABSTRACT

Disclosed is a method and apparatus for storing geofencing information within a SIM card. The geofencing information within the SIM (subscriber identity module) card is updated using an OTA (over the air) Update Server. Such geofencing information for a particular enterprise network is pushed to the SIM within a UE (user equipment) upon detecting that the UE is near, or within, the campus of an enterprise network. In some embodiments, the UE requests an update from the OTA Update Server.

1 Claim, 2 Drawing Sheets

GEOFENCING PROVISIONING SERVER

CROSS-REFERENCE TO RELATED APPLICATIONS— CLAIMS OF PRIORITY

This utility application claims priority under 35 USC section 111 (b) and under 35 USC section 119 (e), to earlier-filed provisional application No. 63/203,112 filed Jul. 8, 2021, entitled "Geofencing Provisioning Service"; and the contents of the above-cited earlier-filed provisional application (App. No. 63/203,112) are hereby incorporated by reference herein as if set forth in full.

BACKGROUND

(1) Technical Field

The disclosed method and apparatus relate generally to communication networks and more particularly, to methods and apparatus for managing geofencing information used to activate or deactivate particular features and functions within a communications network.

Enterprise networks are becoming more common. An enterprise network is a communication network that is established for use exclusively by devices (commonly referred to as UEs (user equipment) that are the members of enterprise network (or those that have been granted permission by the network to use the services and resources provided by the enterprise network. For example, an enterprise network might be established by the Ford Motor Company to allow all of its manufacturing machines to wirelessly communicate with a central management and control center. In addition, such an enterprise network might provide a secure network for employees to communicate with one another and with corporate resources, such as a human resources database of employee benefits.

When a UE is within the "footprint" of the enterprise network (i.e., the UE is within wirelessly communicate range of an enterprise network transceiver), the UE must register with the enterprise network in order to authenticate that the UE has the proper credentials required to gain access to the resources of the network. A UE can continuously search for such transceivers. However, continuously searching for a network requires a significant amount of power over time. Therefore, there is a need for a mechanism by which a UE can determine that it is within, or near, the campus of an enterprise network, and only then start searching for an enterprise network transceiver. The presently disclosed method and apparatus provides such a mechanism.

SUMMARY

OTA (over the air) messages are specially crafted messages used by mobile operators to send APDU (application protocol data unit) commands to SIM (subscriber identification module) cards for management purposes. This type of message can be used to install or delete applets on or from the SIM cards for example. In accordance with some embodiments of the disclosed method and apparatus, geofencing information is stored within a SIM card. The geofencing information within the SIM card is updated using an OTA Update Server. In some embodiments, such geofencing information for a particular enterprise network is pushed to the SIM within a UE upon detecting that the UE is near, or within, the campus of an enterprise network. In some embodiments, the UE requests an update from the OTA Update Server.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
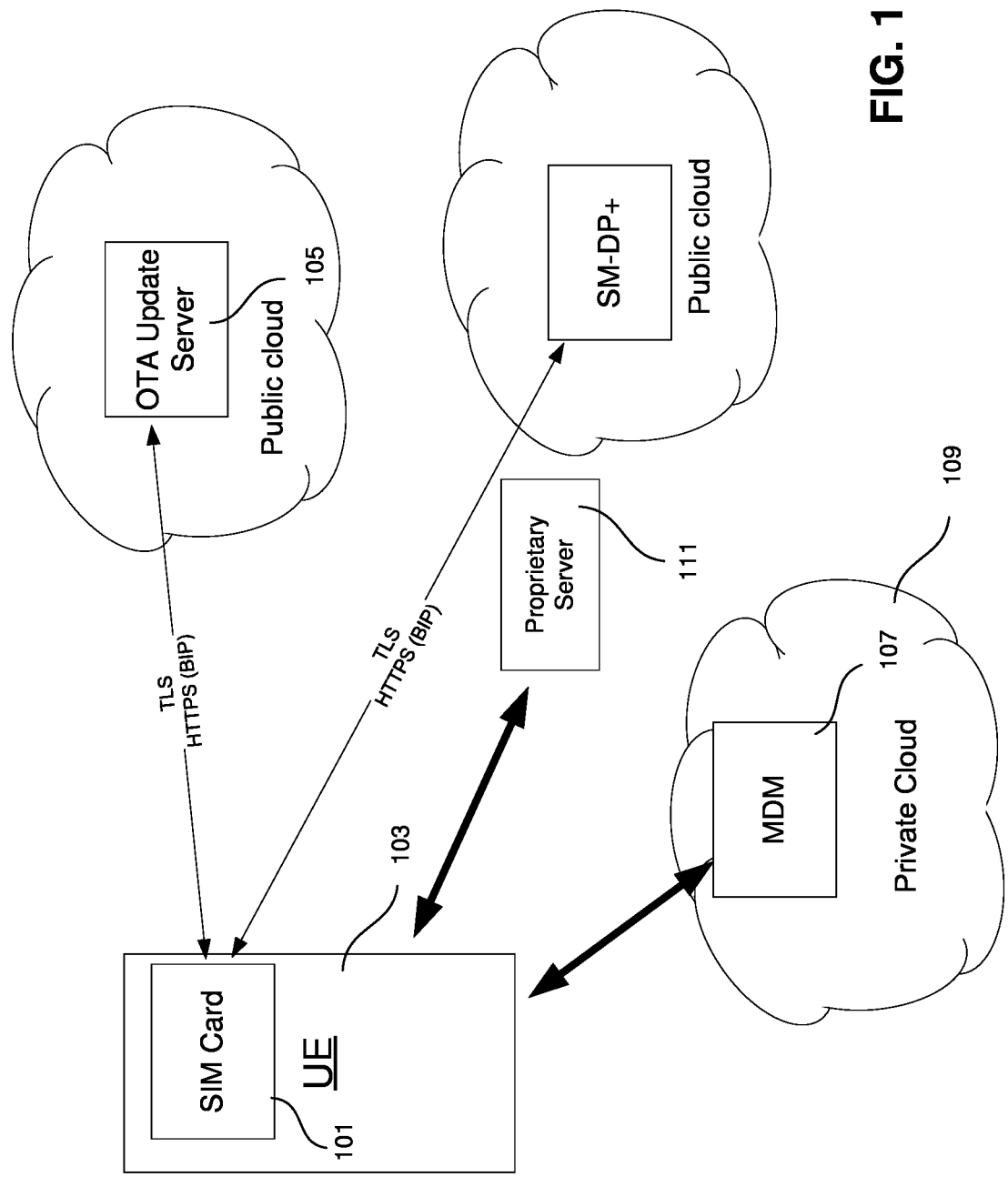
FIG. 1 is an illustration of a system in accordance with some embodiments of the presently disclosed method and apparatus.

FIG. 1 is an illustration of a system in accordance with some embodiments of the presently disclosed method and apparatus. In some embodiments of the disclosed method and apparatus, geofencing information is stored in a SIM (Subscriber Identity Module) or UICC (universal integrated circuit card) of a UE (user equipment device) 103, both of which are hereafter referred to as a SIM 101 for the sake of simplicity. Geofencing information stored within a SIM 101 is secure, while still retaining the ability for an authorized entity to modify the geofencing information using a secure communication scheme, such as the secure OTA messaging currently available to a mobile network operator (MNO) or other network operator to update the subscriber information of a subscribing UE 103.

As part of the CBRS (Citizen Band Radio Service) forum, geofencing information of enterprise campuses is defined and can be provided to a UE 103. This geofencing information defines the physical location of particular enterprise locations. In some embodiments, a geofence definition uses an ellipsoid point with uncertainty circle. In some such embodiments, this requires approximately 50 bytes of fixed overhead. In other embodiments, approximately 14-bytes are needed for each location. The number of locations depends upon the size of the enterprise at issue. For example, Starbucks may have 6,387 locations, Walmart may have 4,743 locations, Home Depot may have 2,200 locations, Apple stores may be located at 271 locations, Universities will typically require few entries (i.e., approximately 10), Corporate offices may have approximately 50 locations, etc. This information is maintained in the UE 103 for various purposes, the specifics of which are not relevant to the disclosed method and apparatus that is the focus of this disclosure.

Geofencing information is determined for each location within an enterprise in which a communication network is to be deployed. Once determined, the information is stored in an OTA update server 105. In some embodiments, the OTA update server is located in a public cloud that is accessible to the UE 103. When geofencing information in the OTA update server 105 changes, updated information is preferably provided to the UEs 103 within the enterprise network.

The disclosed method and apparatus allows secure method and apparatus for delivery of this information and updates to that information to the UE 103. In some embodiments, only a subset of the geofencing information is provided to a UE 103. In such embodiments, determining which subset of the geofencing information is provided is based on: (1) geolocation of the UE (e.g., if a UE is operating in a specific county, it may only need geofence information for the stores within that county); (2) whether a user's access privileges are limited to a particular set of enterprise locations; and/or (3) whether the user's travel and roaming behavior require restricting the particular locations for which the UE 103 can access geofencing information.

In some embodiments, the need to manage subsets of geofencing information without violating the privacy of the user to minimize the geofence information provided to the UE is meet by having the UE provide the cell ID of the particular access point, eNodeB (eNB) or gNodeB (gNB) to which that UE 103 is currently attached.

Information in the SIM 101 of the UE 103 can be updated using a proprietary secure MDM (mobile device management) interface. MDM provides a process used to enhance corporate data security by monitoring, managing and securing mobile devices (such as laptops, smartphones and tablets) that are used in enterprises. MDM solutions allow IT (information technology) teams and administrators to control and distribute security policies and other proprietary information to the mobile devices accessing sensitive corporate data, ensuring the corporate network is secure. However, because MDM interfaces are proprietary, they are limited to those devices that support the particular MDM being used.

In some embodiments, a more generic means for updating geofencing information in the SIM 101 of a UE 103 is provided. In some such embodiments, the OTA update server 105 delivers the geofence information to the UE 103 using an OTA protocol that is well-defined by a specification currently used by SIM credential management platforms used by operators across the world. Because the storage of the geofencing information is tied to the SIM credential, there is no need to deal with the overhead of a GSMA certification. GSMA certification is provided by the GSM Association. The GSM Association is an industry organization that represents the interests of mobile network operators worldwide and certifies applications and protocols that are used by UEs and infrastructure used in certain wireless communication systems. In the case of the OTA messaging that is currently available for updating information within a SIM 101 of a UE 103, additional certification is not required in order to use this messaging to store geofencing information securely within a SIM 101 of a UE 103. Furthermore, using the OTA messaging provides a protocol and the required client credentials to deliver information to the UE 103. The geofence information can be stored in the SIM 101 of the device, potentially occupying a secure location. The OTA protocol uses TLS (transport layer security). TLS is a cryptographic protocol designed to provide communications security over a computer network. Several versions of the TLS protocol are widely used in applications such as email, instant messaging, and voice over IP. In some embodiments of the disclosed method and apparatus, TLS is used to ensure secure access to the SIM 101 within the UE 103. In some embodiments, protocol hypertext transfer protocol over secure socket layer (HTTPS) within a bearer independent protocol (BIP) is used to "pull" geofencing information from an OTA update server. BIP is a secure communication platform that is used in particular to communicate between a SIM 101 and the UE operating system. The geofence information will be stored in the SIM 101 and can be retrieved from the UE 103. The communication between the SIM 101 and the OTA update server 105 is similar to communications that occur between the SIM 101 and an SM-DP+ (Subscription Management-Data Preparation plus Secure Routing) device 106 that resides in a public cloud that updates the SIM 101 with information regarding the operation network subscription.

In some embodiments, a pull method with periodic polling is used. A current timer is used that has a single timer setting. At the end of a period defined by the current timer, the operating system of the UE 103 will trigger the SIM 101 within the UE 103 to contact the OTA update server 105 using the TLS/HTTPS/BIP interface through physical layer in the UE 103. The period of the timer may be defined as once a week, once a month, etc. When triggered, the SIM 101 will request any updates to the geofencing information from the OTA update server 105. In some embodiments, the UE 103 can also contact the OTA update server 105 each time power to the UE 103 is cycled (i.e., each time power is turned on).

A "push" method can also be used, but requires MDM support. While such method may be used in some embodiments, there may be UEs 103 that will not have MDM support. In such embodiments, an MDM platform 107 resides in a private cloud 109. The MDM platform 107 can request the UE operating system to trigger the SIM 101 to request an update from the OTA update server 105. It should be noted that typically, the MDM platform 107 would request the UE 103 to communicate with a proprietary server 111.

In some embodiments, a group comprising several SIM users can be created on an enterprise network, identified by the ICCID/IMSI (integrated circuit card identifier/international mobile subscriber identifier). In this way, an OTA campaign can be established to allow all of the UEs with SIMs in the group to be managed together. In some embodiments, an applet can be provided in the SIM 101 to monitor the location of the device in which the SIM resides. In other embodiments, other applets can be present in the SIM to perform various functions related to the geofencing information.

In some embodiments, the amount of time between requests for updates from the OTA update server is regulated by information downloaded to the SIM 101 from the OTA update server together with the geofencing update. In some embodiments, this value "telescopes". That is, since a network tends to get more stable (less new locations are added as the enterprise network ages), the length of time between updates can get longer over time. This can be under the control of the OTA server 105 or under the control of an applet running in the SIM 101.

Figure 2:
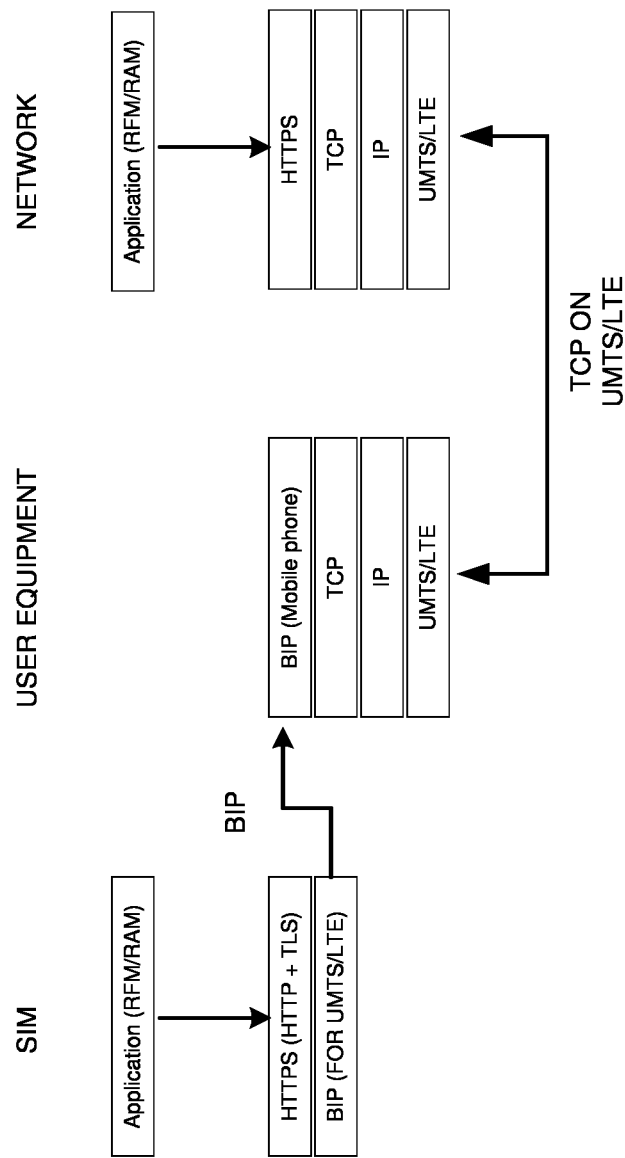
FIG. 2 is an illustration of a protocol stack for the communication between a SIM and an OTA update server.

FIG. 2 is an illustration of a protocol stack for the communication between the SIM 101 and the OTA update server 105.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for updating geofencing information comprising:
    a) receiving within an operating system of a user equipment device (UE) a request to trigger an applet within a secure subscriber identification module (SIM) of the UE to request an update of geofencing information from an OTA update server;
    b) receiving in the UE updated geofencing information in response to the request for an update of geofencing information; and
    c) storing within the secure SIM the updated geofencing information.

* * * * *